United States Patent
Oh et al.

(10) Patent No.: US 12,508,864 B2
(45) Date of Patent: Dec. 30, 2025

(54) AIR CONDITIONER SYSTEM FOR MOBILITY DEVICE

(71) Applicants: HYUNDAI MOTOR COMPANY, Seoul (KR); KIA CORPORATION, Seoul (KR)

(72) Inventors: Hyo Geun Oh, Cheongju-si (KR); Kwang Ok Han, Seoul (KR); Do Ung Hong, Changwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 30 days.

(21) Appl. No.: 18/504,736

(22) Filed: Nov. 8, 2023

(65) Prior Publication Data

US 2024/0399814 A1 Dec. 5, 2024

(30) Foreign Application Priority Data

May 30, 2023 (KR) .................... 10-2023-0069086

(51) Int. Cl.
 *B60H 1/00* (2006.01)
(52) U.S. Cl.
 CPC ..... *B60H 1/00021* (2013.01); *B60H 1/00485* (2013.01); *B60H 2001/00107* (2013.01); *B60H 2001/00114* (2013.01)
(58) Field of Classification Search
 None
 See application file for complete search history.

(56) References Cited

U.S. PATENT DOCUMENTS

| | | | | |
|---|---|---|---|---|
| 2,755,072 | A * | 7/1956 | Kreuttner | F24F 3/0522 165/59 |
| 5,341,652 | A * | 8/1994 | Tajiri | B60H 1/00907 62/244 |

(Continued)

FOREIGN PATENT DOCUMENTS

| | | | | |
|---|---|---|---|---|
| DE | 102011052752 A1 * | 2/2013 | | B60H 1/00057 |
| DE | 102015117962 A1 * | 4/2016 | | B60H 1/00007 |

(Continued)

OTHER PUBLICATIONS

JP-H05155236-A English machine translation (Year: 1993).*
DE-102020002845-A1 English Machine Translation (Year: 2021).*

*Primary Examiner* — Jenna M Maroney
(74) *Attorney, Agent, or Firm* — MCDONNELL BOEHNEN HULBERT & BERGHOFF LLP

(57) ABSTRACT

In an air conditioner system for a mobility device, some inside air communicates with an outdoor heat exchanger when outside air for indoor ventilation is introduced, thereby improving heat pump performance. That is, by allowing indoor cold air to communicate with the outdoor heat exchanger upon mixing the inside and outside air during indoor cooling and allowing indoor warm air to communicate with the outdoor heat exchanger upon mixing the inside and outside air during indoor heating, it is possible to increase the heat pump efficiency as the outdoor heat exchanger recovers the heat of the indoor air during indoor cooling and heating. In addition, introduced is an air conditioner system for a mobility device in which a structure is simplified as inside air may be selectively transmitted to an outdoor heat exchanger side only by applying a flow path structure and a valve.

7 Claims, 3 Drawing Sheets

(56) References Cited

U.S. PATENT DOCUMENTS

| | | | | |
|---|---|---|---|---|
| 11,951,803 B2 * | 4/2024 | Lee | .................... | B60H 1/00064 |
| 2013/0192271 A1 * | 8/2013 | Barnhart | ............ | B60H 1/00478 |
| | | | | 62/3.3 |
| 2016/0161154 A1 * | 6/2016 | Park | .................... | B60H 1/00021 |
| | | | | 62/160 |
| 2017/0087956 A1 * | 3/2017 | Graaf | ................. | B60H 1/00921 |
| 2019/0176565 A1 * | 6/2019 | Shin | .................... | B60H 1/00835 |
| 2020/0130467 A1 * | 4/2020 | Imaizumi | ............ | B60H 1/00849 |
| 2023/0373274 A1 * | 11/2023 | Sivula | ................ | B60H 1/00564 |

FOREIGN PATENT DOCUMENTS

| | | | | | |
|---|---|---|---|---|---|
| DE | 102020002845 A1 * | 4/2021 | ......... | B60H 1/00057 |
| FR | 2690111 A1 * | 10/1993 | ......... | B60H 1/00007 |
| JP | H05155236 A * | 6/1993 | | |
| JP | H05221229 A * | 8/1993 | | |
| JP | 2004322872 A * | 11/2004 | | |
| JP | 2007-69770 A | 3/2007 | | |
| JP | 2010013044 A * | 1/2010 | | |
| WO | WO-2014077180 A1 * | 5/2014 | ......... | B60H 1/00907 |
| WO | WO-2020026634 A1 * | 2/2020 | ......... | B60H 1/00057 |

\* cited by examiner

AIR CONDITIONER SYSTEM FOR MOBILITY DEVICE

CROSS REFERENCE TO RELATED APPLICATIONS

The present application claims priority of Korean Patent Application No. 10-2023-0069086 filed on May 30, 2023, the entire contents of which is incorporated herein for all purposes by this reference.

BACKGROUND

Field of the Disclosure

The present disclosure relates to an air conditioner system for a mobility device, and to an air conditioner system for a mobility device, which selectively transmits a part of indoor air to a heat exchanger in which a temperature is managed through outside air upon introducing the outside air for indoor ventilation, thereby improving heat pump performance.

Description of the Related Art

Recently, electric vehicles are emerging as a social issue in order to implement an eco-friendly technology and solve problems such as energy depletion. An electric vehicle operates by using a motor for receiving electricity from a battery and outputting power. Therefore, since the electric vehicle has the advantages in that there is no emission of carbon dioxide and very little noise and energy efficiency of the motor is higher than that of an engine, the electric vehicle is in the spotlight as an eco-friendly vehicle.

In implementing the electric vehicle, a core technology is a technology related to a battery module, and recently, research on light-weight, miniaturization, and short charging time of the battery has been actively conducted. The battery module may maintain optimal performance and long lifetime only upon used in an optimal temperature environment. However, it is difficult to use the battery in the optimal temperature environment due to heat generated during operation and a change in external temperature.

In addition, since the electric vehicle does not have a source of waste heat generated during combustion in a separate engine like an internal combustion engine, electric heating devices perform indoor heating in winter and warm-up is also required to improve battery charging and discharging performance in cold weather, each cooling water heating type electric heater is separately used by being configured therein. That is, in order to maintain the optimal temperature environment of the battery module, a technology for operating a heating and cooling system for temperature control of the battery module separately from a cooling and heating system for vehicle indoor air conditioning is being used.

Recently, as a technology for improving passengers' comfort, a ventilation mode in which outside air is introduced according to a concentration of indoor carbon dioxide has been applied. However, when outside air is introduced to perform the ventilation mode, a load of the cooling and heating system increases, resulting in increased power consumption of the battery. That is, the cooling and heating system manages a temperature by a heat exchanger exchanging heat with outside air, but there is no method to utilize inside air, resulting in a reduction in energy efficiency.

The matters explained as the background art are for the purpose of enhancing the understanding of the background of the present disclosure and should not be taken as acknowledging that they correspond to the related art already known to those skilled in the art.

SUMMARY

The present disclosure is directed to providing an air conditioner system for a mobility device, which selectively transmits a part of indoor air to a heat exchanger in which a temperature is managed through outside air upon introducing the outside air for indoor ventilation, thereby improving heat pump performance.

In order to achieve the object, an air conditioner system for a mobility device according to the present disclosure includes an outside air flow path provided with an outside air inflow path and an outside air discharge path and provided with a first heat exchanger, an inside air flow path provided with an inside air inflow path and an inside air discharge path to communicate with an indoor space and provided with a second heat exchanger, a first heat exchange flow path communicatively connected to the outside air flow path and the inside air flow path and provided with a first valve to allow outside air communicating with the outside air flow path to selectively communicate with the inside air flow path, and a second heat exchange flow path communicatively connected to the inside air flow path and the outside air flow path and provided with a second valve to allow inside air communicating with the inside air flow path to selectively communicate with the outside air flow path.

An outside air blower may be provided on the outside air flow path, and an inside air blower and a heater may be further provided on the inside air flow path.

Refrigerant may be circulated in the first heat exchanger and the second heat exchanger, and as the second heat exchanger absorbs or dissipates heat by circulation of refrigerant, cooling air or heating air may be provided to an indoor space.

In an inside air mode, the first valve and the second valve may be closed, and in an outside air mode, the first valve may be opened, and the second valve may be closed.

Upon mixing the inside and outside air, the first valve and the second valve may be opened.

Upon mixing the inside and outside air, the first valve and the second valve may be opened, and amounts of opening thereof may be adjusted according to an amount of carbon dioxide or a change in a temperature of an indoor space, or a degree of indoor contamination.

The first heat exchange flow path may have one end connected to the outside air inflow path and the other end connected to a front end of the second heat exchanger of the inside air flow path.

The first valve may be provided at one end of the first heat exchange flow path to form a passage together with the outside air flow path upon closed and may allow some outside air to communicate with the second heat exchange flow path upon opened.

The second heat exchange flow path may have one end connected to the inside air inflow path and the other end connected to a front end of the first heat exchanger of the outside air flow path.

The second valve may be provided at one end of the second heat exchange flow path to form a passage together with the inside air flow path upon closed and may allow some inside air to communicate with the first heat exchange flow path upon opened.

In the air conditioner system for a mobility vehicle having the above-described structure, a part of the inside air communicates with the outdoor heat exchanger upon introducing outside air for indoor ventilation, thereby improving heat pump performance. That is, by allowing the indoor cold air to communicate with the outdoor heat exchanger upon mixing the inside and outside air during indoor cooling and allowing the indoor warm air to communicate with the outdoor heat exchanger upon mixing the inside and outside air during indoor heating, it is possible to increase the heat pump efficiency as the outdoor heat exchanger recovers the heat of the indoor air during indoor cooling and heating.

In addition, the structure is simplified as the inside air can be selectively transmitted to the outdoor heat exchanger side only by applying the flow path structure and the valve.

BRIEF DESCRIPTION OF THE FIGURES

The above and other objects, features and other advantages of the present disclosure will be larger clearly understood from the following detailed description when taken in conjunction with the accompanying drawings, in which.

DETAILED DESCRIPTION

Figure 1:
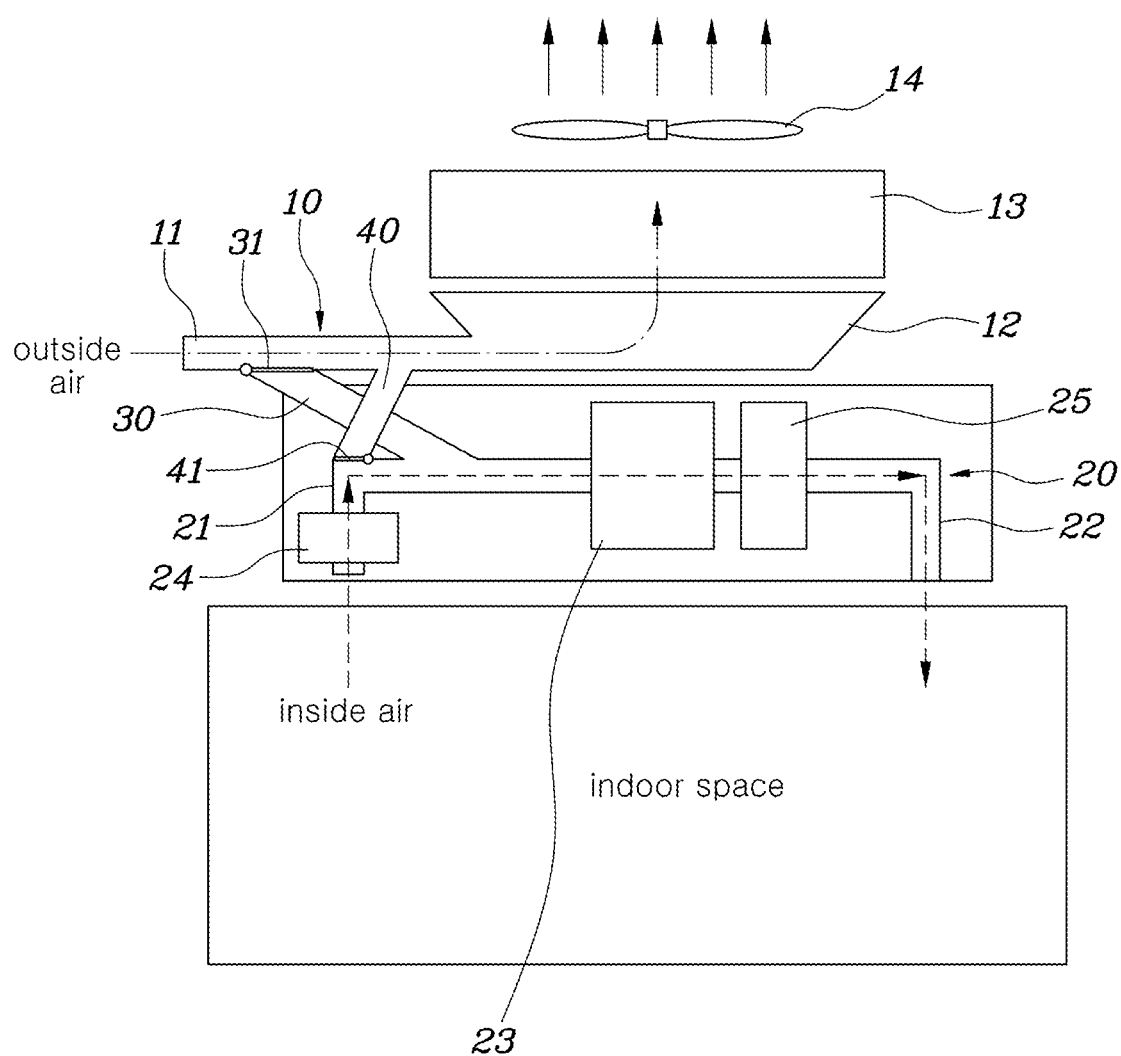
FIG. 1 is a view illustrating an air conditioner system for a mobility device according to one embodiment of the present disclosure.

Hereinafter, embodiments disclosed in this specification will be described in detail with reference to the accompanying drawings, and the same or similar components are denoted by the same reference numerals regardless of the drawing symbols, and overlapping descriptions thereof will be omitted.

The suffixes "module" and "unit" for components used in the following description are given or used interchangeably in consideration of ease of writing the specification and do not have meanings or roles that are distinct from each other by themselves.

In describing the embodiments disclosed in this specification, when it is determined that a detailed description of a related known technology may obscure the gist of the embodiments disclosed in this specification, a detailed description thereof will be omitted. In addition, the accompanying drawings are only for easy understanding of the embodiments disclosed in this specification, and it should be understood that the technical spirit disclosed in this specification is not limited by the accompanying drawings, and all changes, equivalents, or substitutes included in the spirit and technical scope of the present disclosure are included in the accompanying drawings.

Terms including ordinal numbers such as first or second may be used to describe various components, but the components are not limited by the terms. The terms are used only for the purpose of distinguishing one component from another.

When a certain component is described as being "connected" or "coupled" to another component, it is understood that it may be directly connected or coupled to another component or other components may also be disposed therebetween. On the other hand, when a certain component is described as being "directly connected" or "directly coupled" to another component, it should be understood that other components are not disposed therebetween.

The singular expression includes the plural expression unless the context clearly dictates otherwise.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

A controller may include a communication device for communicating with another controller or a sensor to control a function in charge, a memory for storing an operating system or logic commands and input and output information, and one or more processors for performing determination, calculation, decision, and the like necessary for controlling the function in charge.

Hereinafter, an air conditioner system for mobility device according to a preferred embodiment of the present disclosure will be described with reference to the accompanying drawings.

Figure 2:
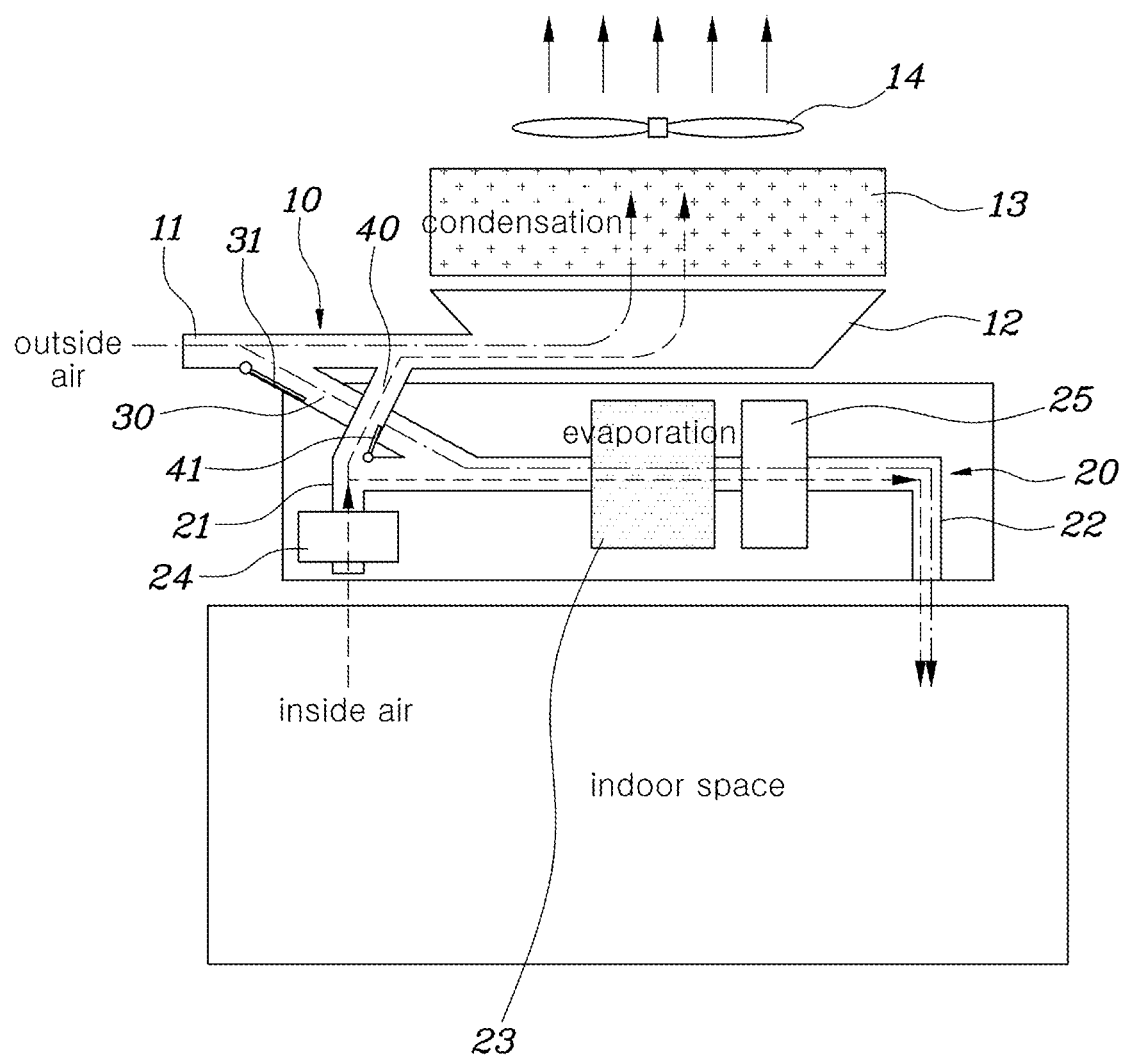
FIG. 2 is a view illustrating the introduction of outside air during indoor cooling of the air conditioner system for a mobility device illustrated in FIG. 1.
Figure 3:
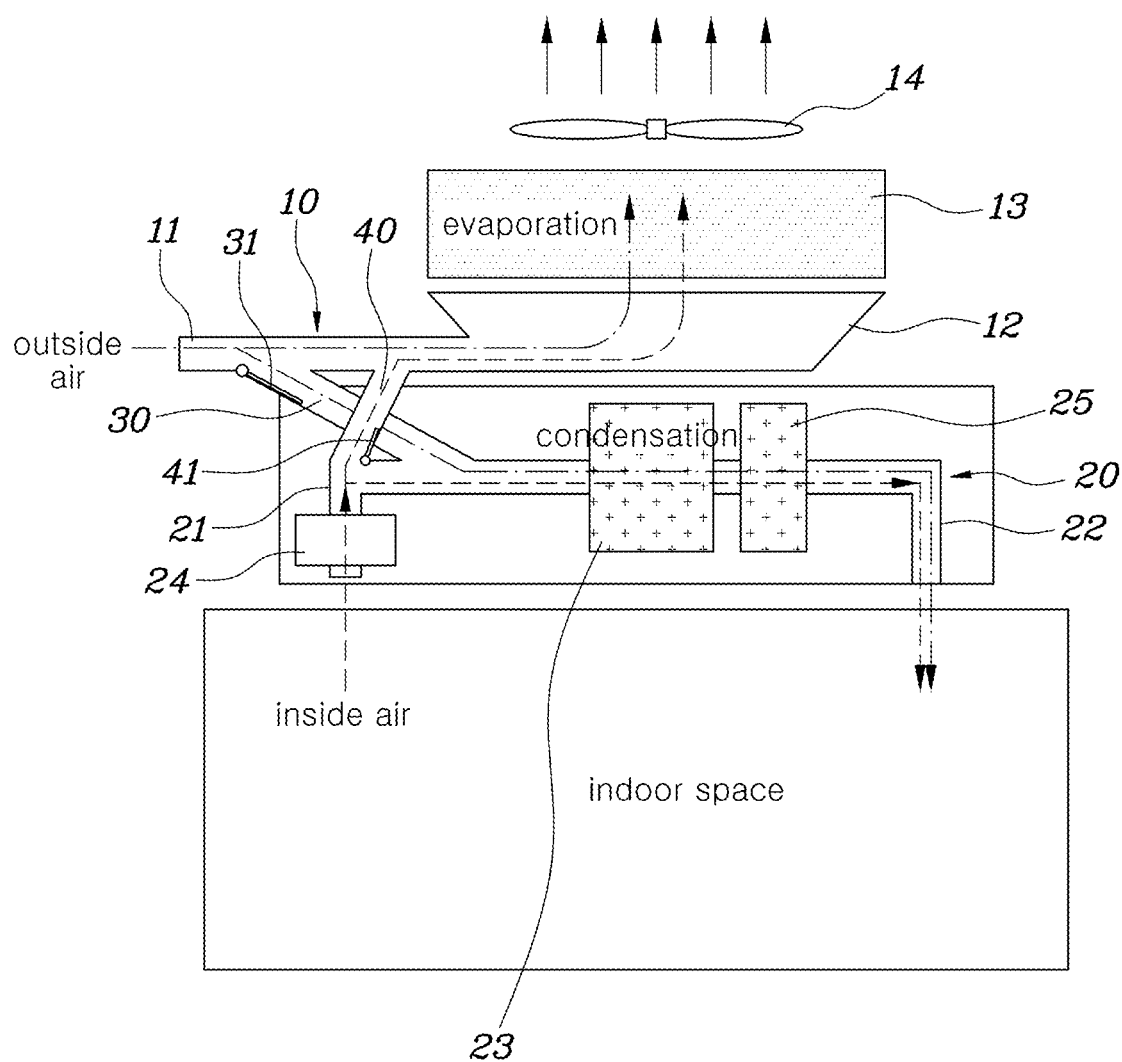
FIG. 3 is a view illustrating the introduction of outside air during indoor heating of the air conditioner system for a mobility device illustrated in FIG. 1.

As illustrated in FIGS. 1 to 3, the air conditioner system for mobility device according to the present disclosure includes an outside air flow path 10 provided with an outside air inflow path 11 and an outside air discharge path 12 and provided with a first heat exchanger 13, an inside air flow path 20 provided with an inside air inflow path 21 and an inside air discharge path 22 to communicate with an indoor space and provided with a second heat exchanger 23, a first heat exchange flow path 30 communicatively connected to the outside air flow path 10 and the inside air flow path 20 and provided with a first valve 31 to allow outside air communicating with the outside air flow path 10 to selectively communicate with the inside air flow path 20, and a second heat exchange flow path 40 communicatively connected to the inside air flow path 20 and the outside air flow path 10 and provided with a second valve 41 to allow inside air communicating with the inside air flow path 20 to selectively communicate with the outside air flow path 10.

In one embodiment, the present disclosure may be applied to a roof of a mobility device and applied to various positions of the mobility device.

The outside air flow path 10 is provided with the outside air inflow path 11 and the outside air discharge path 12 to communicate with the outside air and provided with the first heat exchanger 13 for exchanging heat with the outside air. The first heat exchanger 13 may be provided at the outside air discharge path 12 side, and an outside air blower 14 may be further provided on the outside air flow path 10 to secure an amount of the introduced outside air.

The inside air flow path 20 is provided with the inside air inflow path 21 and the inside air discharge path 22 to communicate with the indoor space and provided with the second heat exchanger 23. The second heat exchanger 23 may be provided at the inside air discharge path 22 side, and an inside air blower 24 may be further provided on the inside air flow path 20. In addition, a heater 25 may be further provided on the inside air flow path 20 to supplement an insufficient heat source during indoor heating, and the heater 25 may be formed as a positive temperature coefficient (PTC) heater.

Here, refrigerant may be circulated in the first heat exchanger 13 and the second heat exchanger 23, and heat may be radiated or absorbed through the circulation of the refrigerant by the first heat exchanger 13 and the second heat exchanger 23 connected to a line through which the refrigerant circulates. Therefore, when the refrigerant communicates with the second heat exchanger 23, cooling air or heating air may be provided to the indoor space according to whether the second heat exchanger 23 absorbs or dissipates heat.

For example, the first heat exchanger 13 and the second heat exchanger 23 are connected to a refrigerant circuit in which the refrigerant circulates, and a compressor and an expansion valve are provided in the refrigerant circuit. Here, during indoor cooling, the first heat exchanger 13 serves as a condenser to dissipate heat and condense the refrigerant, and the second heat exchanger 23 serves as an evaporator to absorb heat and cool the air supplied to the indoor. In addition, during indoor heating, the first heat exchanger 13 serves as an evaporator to absorb heat and manage a temperature of the refrigerant, and the second heat exchanger 23 serves as a condenser to dissipate heat and heat the air supplied to the indoor. As described above, the refrigerant circuit may be provided with components through which the refrigerant circulates, such as a compressor, an expansion valve, and an additional heat exchanger, and each of the first heat exchanger 13 and the second heat exchanger 23 may perform heat pump or indoor cooling and heating through temperature management of the refrigerant through the circulation of the refrigerant.

In the present disclosure, the first heat exchange flow path 30 and the second heat exchange flow path 40 for selectively changing a flow direction of the outside air or the inside air in order to increase heat efficiency.

The first heat exchange flow path 30 is connected to communicate with the outside air flow path 10 and the inside air flow path 20, and the outside air of the outside air flow path 10 may selectively communicate with the inside air flow path 20 depending on whether the first valve 31 is operated.

The second heat exchange flow path 40 is connected to communicate with the inside air flow path 20 and the outside air flow path 10, and the inside air of the inside air flow path 20 may selectively communicate with the outside air flow path 10 depending on whether the second valve 41 is operated.

Therefore, by allowing the outside air communicating with the outside air flow path 10 to selectively communicate with the inside air flow path 20 and allowing the inside air communicating with the inside air flow path 20 to communicate with the outside air flow path 10, it is possible to increase the heat pump efficiency through the first heat exchanger 13.

Therefore, specifically describing the present disclosure, the opening and closing of the first valve 31 and the second valve 41 may be controlled according to various modes according to the circulation of the inside and outside air. The first valve 31 and the second valve 41 are operated according to commands of the controller, and the controller may control the first valve 31 and the second valve 41 by collecting various pieces of information such as an indoor temperature, a concentration of indoor carbon dioxide, and an indoor pollution level.

Specifically, in an inside air mode, the first valve 31 and the second valve 41 may be closed. That is, as the first valve 31 and the second valve 41 are closed, the inside air mode in which the outside air introduced from the outside air flow path 10 through the outside air inflow path 11 communicates with the outside air discharge path 12 and the inside air introduced through the inside air inflow path 21 from the inside air flow path 20 is circulated to the indoor space through the inside air discharge path 22 may be performed.

Meanwhile, in an outside air mode, the first valve 31 may be opened, and the second valve 41 may be closed. That is, as the first valve 31 is opened, some of the outside air introduced through the outside air inflow path 11 from the outside air flow path 10 communicate with the inside air flow path 20 through the first heat exchange flow path 30 so that the outside air may be provided to the indoor space. Here, the second valve 41 is closed to prevent a rapid change in a temperature of the indoor space due to the inside air discharged to the outside.

In the outside air mode, only the outside air blower 14 is driven, and the inside air blower 24 is not driven.

In the above-described inside air mode or outside air mode, cooling or heating air conditioning may be selectively performed according to the refrigerant circulated in the first heat exchanger 13 and the second heat exchanger 23.

Meanwhile, upon mixing the inside and outside air, the first valve 31 and the second valve 41 are operated to be opened.

That is, a ventilation mode is performed when the concentration of carbon dioxide in the indoor space increases or a degree of indoor contamination due to fine dust increases, and since a temperature of the indoor space may be changed as the outside air is introduced into the indoor space during ventilation, heating and cooling loads may be increased to maintain the temperature of the indoor space.

Therefore, in the present disclosure, by opening the first valve 31 and the second valve 41, some of the outside air communicating with the outside air flow path 10 communicates with the inside air flow path 20 to introduce the outside air into the indoor space, and some of the inside air communicating with the inside air flow path 20 communicates with the outside air flow path 10 to be provided to the first heat exchanger 13. Therefore, the first heat exchanger 13 may receive the inside air and exchange heat with the outside air and the inside air, thereby increasing heat pump efficiency.

That is, as illustrated in FIG. 2, upon mixing the inside and outside air during indoor cooling, the first heat exchanger 13 serves as a condenser, and the second heat exchanger 23 serves as an evaporator. Here, during indoor cooling, the cooling air passing through the second heat exchanger 23 is provided to the indoor space, and the second valve 41 is opened so that cold air is provided to the first heat exchanger 13 of the outside air flow path 10 through the second heat exchange flow path 40, thereby increasing the cooling efficiency of the refrigerant through the first heat exchanger 13.

In addition, as illustrated in FIG. 3, upon mixing the inside and outside air during indoor heating, the first heat exchanger 13 serves as an evaporator, and the second heat exchanger 23 serves as a condenser. Here, during indoor heating, the heating air passing through the second heat exchanger 23 is provided to the indoor space, and the second valve 41 is opened so that warm inside air is provided to the second heat exchanger 23 of the outside air flow path 10 through the second heat exchange flow path 40, thereby increasing heat absorption efficiency of the refrigerant through the first heat exchanger 13.

Therefore, the heat pump efficiency according to the circulation of the refrigerant on the refrigerant line can be increased, thereby reducing the cooling and heating loads.

Meanwhile, upon mixing the inside and outside air during indoor cooling or heating, the first valve 31 and the second valve 41 are opened, and an amount of opening may be adjusted according to the amount of carbon dioxide or the change in the temperature of the indoor space, or the degree of indoor contamination.

To this end, a carbon dioxide measurement sensor, a fine dust measurement sensor, and a temperature sensor may be provided in the mobility device, and opening and closing positions of the first valve 31 and the second valve 41 may be determined based on information collected through each sensor.

Here, when the concentration of the carbon dioxide or the concentration of the fine dust is higher than a reference value, the amounts of opening of the first valve 31 and the second valve 41 are adjusted according to a numerical value out of the reference value to adjust the amount of the introduced outside air and the amount of the discharged inside air. That is, when the amounts of opening of the first valve 31 and the second valve 41 is increased, the amount of the introduced outside air and the amount of the discharged inside air may be increased, thereby quickly securing the comfort of the indoor space, and the amounts of opening of the first valve 31 and the second valve 41 may be adjusted so that the temperature of the indoor space does not depart from a predetermined temperature range further in consideration of the temperature of the indoor space.

As described above, in the present disclosure, upon mixing the inside and outside air to introduce the outside air into the indoor space, by providing the outside air to the inside air flow path 20 and selectively providing the inside air to the first heat exchanger 13 provided in the outside air flow path 10, it is possible to increase the temperature management efficiency of the refrigerant circulated in the first heat exchanger 13, thereby improving the heat pump performance. As described above, according to the present disclosure, it is possible to reduce the power consumption of the battery by recovering heat of the inside air through the first heat exchanger 13 during ventilation, thereby reducing the power consumption of the battery.

Meanwhile, the first heat exchange flow path 30 may have one end connected to the outside air inflow path 11 and the other end connected to a front end of the second heat exchanger 23 of the inside air flow path 20. As described above, as one end of the first heat exchange flow path 30 is connected to the outside air inflow path 11, the outside air introduced through the outside air inflow path 11 may smoothly communicate with the inside air flow path 20 as well. In addition, as the other end of the first heat exchange flow path 30 is connected to the front end of the second heat exchanger 23 on the inside air flow path 20, the outside air can be prevented from flowing back into the inside air inflow path 21, and the temperature can be adjusted through the second heat exchanger 23 to communicate with the indoor space through the inside air discharge path 22. In addition, as the first heat exchange flow path 30 has one end connected to the outside air inflow path 11 side of the outside air flow path 10 and the other end connected to the inside air discharge path 22 side of the inside air flow path 20, the first heat exchange flow path 30 may extend obliquely with respect to the circulation direction of the outside air, thereby stabilizing the circulation flow of the outside air and preventing the backflow of the outside air.

Here, the first valve 31 may be provided at one end of the first heat exchange flow path 30 to form a passage together with the outside air flow path 10 upon closed and may allow some outside air to communicate with the second heat exchange flow path 40 upon opened. The first valve 31 may have a door structure and may be formed to match an inner circumferential surface of the outside air flow path 10 while closing the first heat exchange flow path 30 at the closed position. That is, since the first valve 31 is positioned at one end of the first heat exchange flow path 30 and is configured to form the same line as an inner wall of the outside air flow path 10 at the closed position, and thus even when the first valve 31 is closed, it is possible to minimize interference between a fluid communicating with the outside air flow path 10 and the first valve 31 to form a smooth circulation flow.

In addition, upon opened, the first valve 31 is installed to rotate inside the first heat exchange flow path 30 to allow the outside air to sufficiently communicate with the outside air flow path 10 in which the amount of circulated outside air needs to be secured and allow some outside air to communicate with the inside air flow path 20 through the first heat exchange flow path 30.

Meanwhile, the second heat exchange flow path 40 may have one end connected to the inside air inflow path 21 and the other end connected to the front end of the first heat exchanger 13 of the first heat exchanger 13.

As described above, as one end of the second heat exchange flow path 40 is connected to the inside air inflow path 21, the inside air introduced through the inside air inflow path 21 of the inside air flow path 20 may smoothly circulate. In addition, as the other end of the second heat exchange flow path 40 is connected to the front end of the first heat exchanger 13 on the outside air flow path 10, the inside air can be prevented from flowing back into the outside air inflow path 11, and the temperature can be adjusted through the first heat exchanger 13 and discharged to the outside through the outside air discharge path 12. In addition, as the second heat exchange flow path 40 has one end connected to the inside air inflow path 21 side of the inside air flow path 20 and the other end connected to the outside air discharge path 12 side of the outside air flow path 10, the second heat exchange flow path 40 may extend obliquely with respect to the circulation direction of the inside air, thereby stabilizing the circulation flow of the inside air and preventing the backflow of the inside air.

Here, the second valve 41 may be provided at one end of the second heat exchange flow path 40 to form a passage together with the inside air flow path 20 upon closed and may allow some inside air to communicate with the first heat exchange flow path 30 upon opened. The second valve 41 may have a door structure, and is provided at one end of the second heat exchange flow path 40 to form a passage together with the inside air flow path 20 at the closed position. That is, since the second valve 41 is positioned at one end of the second heat exchange flow path 40 and is configured to form the same line as an inner wall of the inside air flow path 20 at the closed position, and thus even when the second valve 41 is closed, it is possible to minimize interference between a fluid communicating with the inside air flow path 20 and the second valve 41 to form a smooth circulation flow.

In the air conditioner system for mobility device having the above-described structure, a part of the inside air communicates with the outdoor heat exchanger upon introducing outside air for indoor ventilation, thereby improving heat pump performance. That is, by allowing the indoor cold air to communicate with the outdoor heat exchanger upon mixing the inside and outside air during indoor cooling and allowing the indoor warm air to communicate with the outdoor heat exchanger upon mixing the inside and outside air during indoor heating, it is possible to increase the heat pump efficiency as the outdoor heat exchanger recovers the heat of the indoor air during indoor cooling and heating.

In addition, the structure is simplified as the inside air can be selectively transmitted to the outdoor heat exchanger side only by applying the flow path structure and the valve.

Although the specific exemplary embodiments of the present disclosure have been shown and described, it will be apparent to those skilled in the art that the present disclosure may be variously improved and changed without departing from the technical spirit of the present disclosure provided by the appended claims.

The invention claimed is:

1. An air conditioner system for a mobility device, comprising:
   an outside air flow path provided with an outside air inflow path and an outside air discharge path, the outside air flow path having a first heat exchanger;
   an inside air flow path provided with an inside air inflow path and an inside air discharge path configured to communicate with an indoor space, the inside air flow path having a second heat exchanger;
   a first heat exchange flow path communicatively connected to the outside air flow path and the inside air flow path, the first heat exchange flow path having a first valve to allow outside air communicating with the outside air flow path to selectively communicate with the inside air flow path; and
   a second heat exchange flow path communicatively connected to the inside air flow path and the outside air flow path, the second heat exchange flow path having a second valve to allow inside air communicating with the inside air flow path to selectively communicate with the outside air flow path;
   wherein the first heat exchange flow path has one end connected to the outside air inflow path and an other end connected to an upstream of the second heat exchanger of the inside air flow path such that the second heat exchanger recovers heat of indoor air;
   wherein the second heat exchange flow path has one end connected to the inside air inflow path at the upstream of the second heat exchanger and an other end connected to an upstream of the first heat exchanger of the outside air flow path such that the first heat exchanger recovers the heat of the indoor air; and
   wherein refrigerant is circulated in the first heat exchanger and the second heat exchanger, and as the second heat exchanger absorbs or dissipates heat by circulation of the refrigerant, cooling air or heating air is provided to an indoor space.

2. The air conditioner system of claim 1, wherein an outside air blower is provided on the outside air flow path, and an inside air blower and a heater are provided on the inside air flow path.

3. The air conditioner system of claim 1, wherein in an inside air mode, the first valve and the second valve are closed, and in an outside air mode, the first valve is opened, and the second valve is closed.

4. The air conditioner system of claim 1, wherein upon mixing the inside and outside air, the first valve and the second valve are opened.

5. The air conditioner system of claim 1, wherein upon mixing the inside and outside air, the first valve and the second valve are opened, and amounts of opening of the first and second valves are adjusted according to an amount of carbon dioxide, a change in a temperature of an indoor space, or a degree of indoor contamination.

6. The air conditioner system of claim 1, wherein the first valve is provided at one end of the first heat exchange flow path to form a passage together with the outside air flow path when closed, and wherein the first valve is configured to allow an amount of outside air to communicate with the second heat exchange flow path when opened.

7. The air conditioner system of claim 1, wherein the second valve is provided at one end of the second heat exchange flow path to form a passage together with the inside air flow path when closed, and wherein the second valve is configured to allow an amount of inside air to communicate with the first heat exchange flow path upon opened.

* * * * *